United States Patent
Tang et al.

(10) Patent No.: US 8,842,983 B2
(45) Date of Patent: Sep. 23, 2014

(54) DATA TRANSMISSION SYSTEMS AND METHODS

(75) Inventors: Jinkuan Tang, Beijing (CN); Jiin Lai, Taipei (TW); Hao-Hsuan Chiu, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 619 days.

(21) Appl. No.: 12/940,347

(22) Filed: Nov. 5, 2010

(65) Prior Publication Data

US 2012/0008938 A1 Jan. 12, 2012

(30) Foreign Application Priority Data

Jul. 8, 2010 (CN) .......................... 2010 1 0221271

(51) Int. Cl.
*H04B 10/08* (2006.01)
*H04B 10/03* (2013.01)
(52) U.S. Cl.
CPC ....................................... *H04B 10/03* (2013.01)
USPC ................... 398/9; 398/17; 398/22; 398/135; 398/138
(58) Field of Classification Search
CPC .... H04B 10/03; H04B 10/035; H04B 10/038; H04B 10/0771; H04B 2210/08; H04B 10/0791
USPC ............... 398/1, 2, 5, 6, 9, 11, 10, 17, 18, 22, 398/135, 138, 139
See application file for complete search history.

(56) References Cited

U.S. PATENT DOCUMENTS

| | | | |
|---|---|---|---|
| 7,113,698 B1 * | 9/2006 | Ryhorchuk et al. ............ | 398/10 |
| 7,581,890 B2 * | 9/2009 | Crew .............................. | 385/88 |
| 7,599,623 B2 * | 10/2009 | Stock et al. ...................... | 398/74 |
| 7,609,728 B2 * | 10/2009 | Arikawa et al. ................ | 370/503 |
| 7,853,731 B1 * | 12/2010 | Zeng ............................... | 710/18 |
| 8,270,840 B2 * | 9/2012 | Lai ................................. | 398/138 |

(Continued)

FOREIGN PATENT DOCUMENTS

| | | |
|---|---|---|
| CN | 1708955 | 12/2005 |
| TW | 200723007 | 6/2007 |

OTHER PUBLICATIONS

English language translation of abstract of CN 1708955 (published Dec. 14, 2005).
Taiwanese language office action dated Oct. 19, 2011.

(Continued)

*Primary Examiner* — Daniel Washburn
*Assistant Examiner* — Hibret Woldekidan
(74) *Attorney, Agent, or Firm* — McClure, Qualey & Rodack, LLP

(57) ABSTRACT

A data transmission system and method are provided. The data transmission system includes a first link partner and an optical transceiver unit. The first link partner includes a controller. When the first link partner is in an abnormal operation mode, the controller controls the first link partner to exit from the abnormal operation mode. The optical transceiver unit is coupled between the first link partner and a second link partner and performs data transmission between the first link partner and the second link partner. According to the data transmission system and method, one link partner can accurately detect whether another link partner is coupled to the one link partner through an optical transceiver unit. Accordingly, data transmission between the two link partners can be stably performed through the optical transceiver unit.

16 Claims, 6 Drawing Sheets

(56) References Cited

U.S. PATENT DOCUMENTS

| | | | |
|---|---|---|---|
| 8,295,160 B2* | 10/2012 | Fujita et al. | 370/217 |
| 8,521,031 B2* | 8/2013 | Tang et al. | 398/136 |
| 2003/0095303 A1* | 5/2003 | Cunningham et al. | 359/110 |
| 2005/0053381 A1* | 3/2005 | Wood | 398/140 |
| 2005/0185956 A1* | 8/2005 | Emongkonchai | 398/17 |
| 2011/0013905 A1* | 1/2011 | Wang et al. | 398/21 |

OTHER PUBLICATIONS

English language translation of abstract of TW 200723007 (published Jun. 16, 2007).

* cited by examiner

DATA TRANSMISSION SYSTEMS AND METHODS

CROSS REFERENCE TO RELATED APPLICATIONS

This application claims the benefit of China application Serial No. 201010221271.1 filed Jul. 8, 2010, the subject matter of which is incorporated herein by reference.

BACKGROUND OF THE INVENTION

1. Field of the Invention

The invention relates to a data transmission system and method, and more particularly to a data transmission system and method for accurately detecting a terminal apparatus.

2. Description of the Related Art

As optical transmission techniques develop, optical transmission techniques have been applied more widely as optical fiber transmission has transmission rate/transmission distance benefits and anti-interference capabilities. Due to optical transmission technique advantages, more applications are coupling a host and a device respectively to optical transceiver modules to perform opto-electronic conversion and then perform data transmission through an optical fiber. However, there are some problems occurring in the above applications. It is desired to provide a data transmission system and method for one link partner to accurately detect whether another link partner is coupled to the one link partner through an optical transceiver unit. For such a system and method, the data transmission between the two link partners (such as a host and a device) would be stably performed through the optical transceiver unit, which would solve the problems found in current optical transmission techniques.

BRIEF SUMMARY OF THE INVENTION

An exemplary embodiment of a data transmission system includes a first link partner and an optical transceiver unit. The first link partner includes a controller. When the first link partner is in an abnormal operation mode, the controller controls the first link partner to exit from the abnormal operation mode. The optical transceiver unit is coupled between the first link partner and a second link partner and performs data transmission between the first link partner and the second link partner.

An exemplary embodiment of a data transmission method for a data transmission system is provided. The data transmission system includes a first link partner, a second link partner, and an optical transceiver unit coupled between the first link partner and the second link partner. The data transmission method includes the steps of: determining whether a predetermined condition has been satisfied when the first link partner is in an abnormal operation mode; and controlling the first link partner to exit from the abnormal operation mode when the predetermined condition has been satisfied.

According to the data transmission system and the data transmission method, a link partner can accurately detect whether another link partner is coupled to the link partner through an optical transceiver unit. Accordingly, data transmission between the two link partners can be stably performed through the optical transceiver unit.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
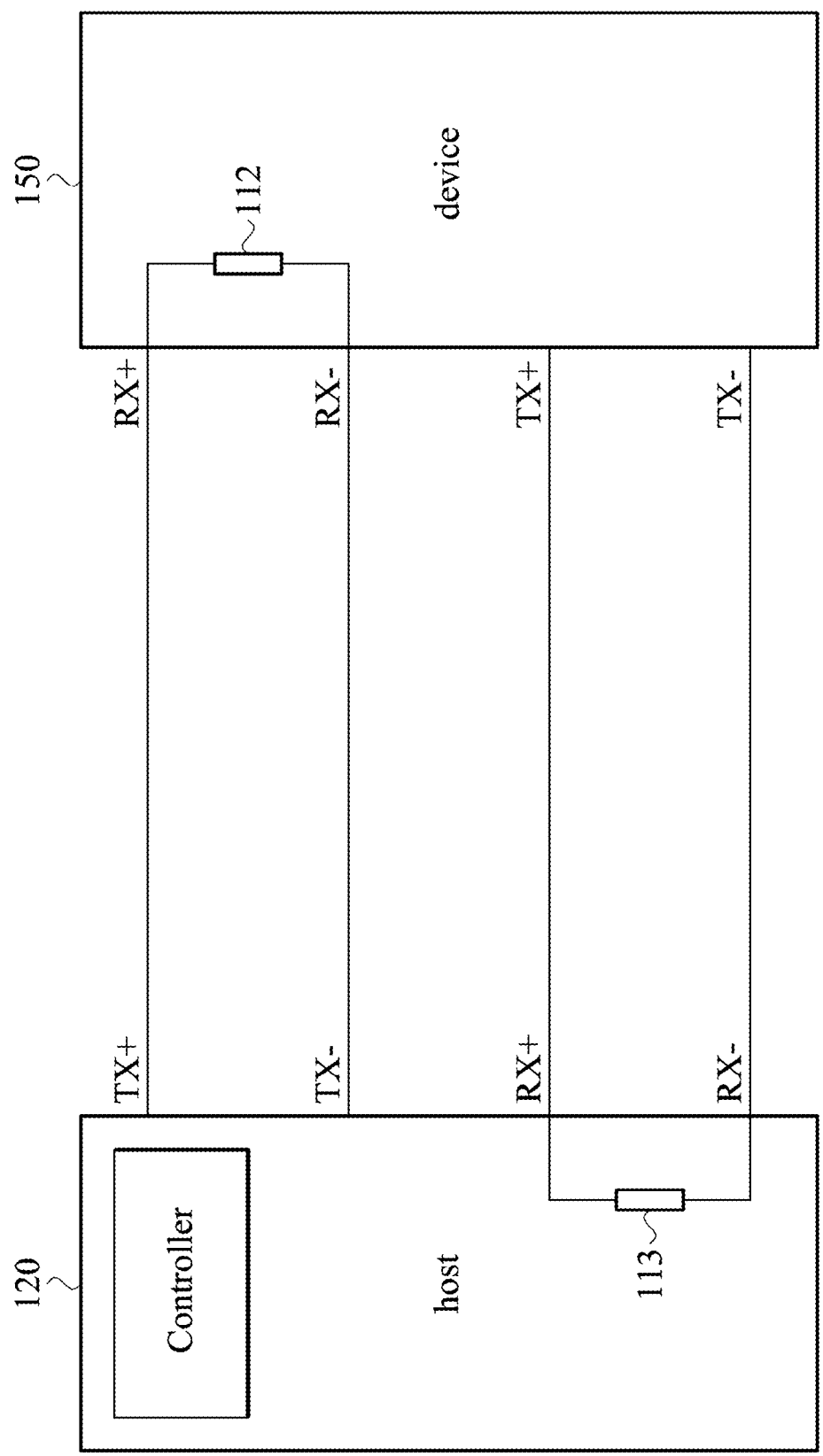
FIG. 1 is a block diagram showing data transmission between a host and a device.

FIG. 1 is a block diagram showing data transmission between a host and a device. In FIG. 1, a host 120 may be a high-speed electronic transceiver which has a PCI-e (peripheral controller interface-express) interface specification or a USB 3.0 interface specification and supports a hot plugging function. The host 120 performs polling in a predetermined time period to detect whether a device has been inserted. When the host 120 detects that a device 150 has been inserted, the host 120 issues a link training sequence to build a link to the device 150. At the same time, the device 150 also performs polling to detect whether a host is present. When the device 150 detects that the host 120 is present, the device 150 also issues a link training sequence to build a link to the host 120.

The connection between the host 120 and the device 150 is shown in FIG. 1. A positive transmitting signal terminal TX+ and a negative transmitting signal terminal TX− of the host 120 are coupled to a positive receiving signal terminal RX+ and a negative receiving signal terminal RX− of the device 150, respectively, so that data may be sent from the host 120 to the device 150. The data sent from the host 120 to the device 150 can be sent in a form of a differential signal pair. A positive receiving signal terminal RX+ and a negative receiving signal terminal RX− of the host 120 are coupled to a positive transmitting signal terminal TX+ and a negative transmitting signal terminal TX− of the device 150, respectively, so that data may be sent from the device 150 to the host 120. The data sent from the device 150 to the host 120 can be sent in a form of a differential signal pair. The host 120 performs polling to detect whether there is a differential terminator impedance coupled between the positive transmitting signal terminal TX+ and the negative transmitting signal terminal TX− of the host 120 to determine whether a device has been inserted according to the detection result. When the device 150 is coupled to the host 120 as shown in FIG. 1 and ready for data transmission, a differential terminator impedance 112 is coupled between the positive receiving signal terminal RX+ and the negative receiving signal terminal RX− of the device 150. In one embodiment, each of the positive receiving signal terminal RX+ and the negative receiving signal terminal RX− of the device 150 is coupled to a ground through a resistor to form the differential terminator impedance 112. The host 120 detects that there is a differential terminator impedance, which is the differential terminator impedance 112, coupled between the positive transmitting signal terminal TX+ and the negative transmitting signal terminal TX− of the host 120, and determines that the device 150 has been inserted. The host 120 then issues a link training sequence to build a link to the device 150. Also, the device 150 performs polling to detect whether there is a differential terminator impedance 113 coupled between the positive transmitting signal terminal TX+ and the negative transmitting signal terminal TX− of the device 150 to determine whether the device 150 is coupled to the host 120. In one embodiment, each of the positive receiving signal terminal RX+ and the negative receiving signal terminal RX− of the host 120 is coupled to a ground through a resistor to form the differential terminator impedance 113. When the device 150 detects there is a differential terminator impedance 113 coupled between the positive transmitting signal terminal TX+ and the negative transmitting signal terminal TX− of the device 150, the device 150 issues a response signal to the host 120. When the host 120 receives the response signal, the link training sequence has been built successfully, and the link between the host 120 and the device 150 is performed normally to perform data transmission. In one embodiment, the response signal is a low frequency periodic signal (LFPS) with a period range of 20~100 ns.

Figure 2:
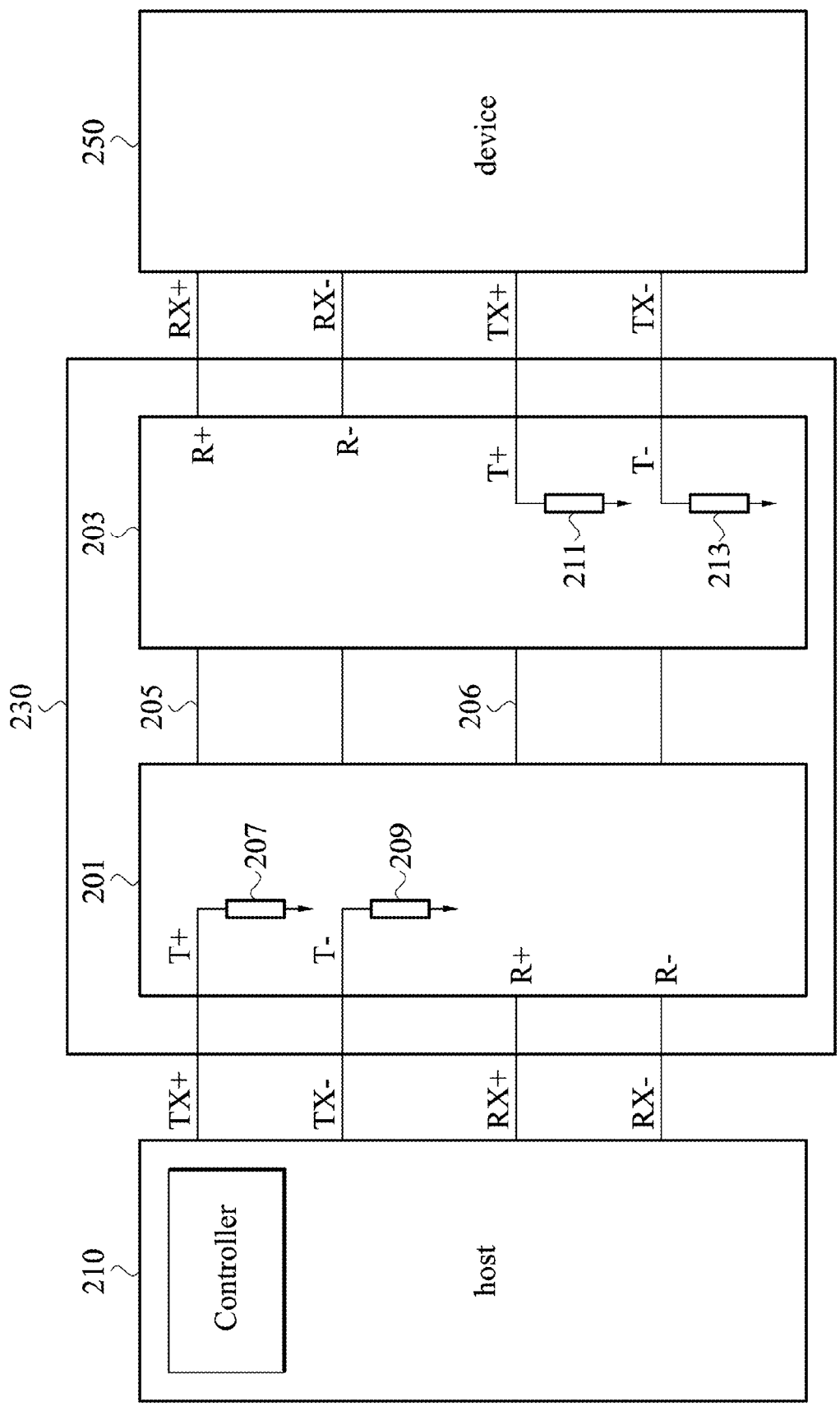
FIG. 2 is a block diagram showing data transmission between a host and a device through an optical transceiver unit.

In certain applications, for example, when a host and a device are coupled to optical transceiver modules respectively to perform opto-electronic conversion and then data transmission between the host and the device is performed through an optical fiber, there are some problems, which will be described in the following. FIG. 2 is a block diagram showing data transmission between a host and a device through an optical transceiver unit. In one embodiment, the optical transceiver unit is an active optical cable (AOC). As shown in FIG. 2, an optical transceiver unit 230 includes an optical transceiver module 201, an optical transceiver module 203, and an optical fiber 205. For clear drawings and convenient description, FIG. 2 only shows electrical connection of data transmission between a host 210 and a device 250, but optical passive components in the host 210 and the device 250, such as laser diodes and photo-detect diodes are omitted. The optical passive components are used for the conversions between electronic signals and optical signals.

In FIG. 2, a positive transmitting signal terminal TX+ and the negative transmitting signal terminal TX− of the host 210 are coupled to a first transmitting pair T+/T− of the optical transceiver module 201. The optical transceiver module 201 is coupled to the host 210 to convert an electronic signal issued by the host 210 to an optical signal. The optical fiber 205 is coupled between the two optical transceiver modules 201 and 203 to perform optical transmission therebetween. The optical transceiver module 203 is coupled to the device 250 to convert an optical signal to an electronic signal, and the electronic signal is provided to a positive receiving signal terminal RX+ and a negative receiving signal terminal RX− of the device 250 through a second receiving pair R+/R− of the optical transceiver module 203 for data transmission.

When one terminal of the optical transceiver unit 230 (the terminal close to the optical transceiver module 201) is coupled to the host 210, since the optical transceiver module 201 includes internal fixed resistors 207 and 209 which are coupled to the first transmitting pair T+/T− of the optical transceiver module 201, the host 210 detects that there is a differential terminator impedance coupled between the positive transmitting signal terminal TX+ and the negative transmitting signal terminal TX− of the host 210 to determine that a device has been inserted. Thus, the host 210 issues a link training sequence. However, when the other terminal of the optical transceiver unit 230 has been not coupled to the device 250, the link training sequence is built unsuccessfully, and the host 210 enters an abnormal operation mode. In the abnormal operation mode, the host 210 can not perform data transmission with the device 250 any more and also not exit from the abnormal operation mode. Only after the host 210 is reset, will the host 210 be able to determine whether a device has been coupled to the host 210 again. In one embodiment, the abnormal operation mode is a compliance mode in which the completeness of the signal issued by the host 210 is examined.

Moreover, as shown in FIG. 2, the positive transmitting signal terminal TX+ and the negative transmitting signal terminal TX− of the device 150 are coupled to a second transmitting pair T+/T− of the optical transceiver module 203. The optical transceiver module 203 is coupled to the device 250 to convert an electronic signal issued by the device 250 to an optical signal. An optical fiber 206 is coupled between the two optical transceiver modules 201 and 203 to perform optical transmission therebetween. The optical transceiver module 201 is coupled to the host 210 to convert an optical signal to an electronic signal, and the electronic signal is provided to a positive receiving signal terminal RX+ and a negative receiving signal terminal RX− of the host 210 through a first receiving pair R+/R− of the optical transceiver module 201 for data transmission.

When one terminal of the optical transceiver unit 230 (the terminal close to the optical transceiver module 203) is coupled to the device 250, since the optical transceiver module 203 includes internal fixed resistors 211 and 213 which are coupled to the second transmitting pair T+/T− of the optical transceiver module 203, the device 250 detects that there is a differential terminator impedance coupled between the positive transmitting signal terminal TX+ and the negative transmitting signal terminal TX− of the device 250 to determine that a host has been inserted. Thus, the device 250 issues a link training sequence. However, when the other terminal of the optical transceiver unit 230 is not coupled to the host 210, the link training sequence is built unsuccessfully, and the device 250 enters an abnormal operation mode. In one embodiment, the abnormal operation mode is a compliance mode in which the completeness of the signal issued by the device 250 is examined In another embodiment, the abnormal operation mode is a testing mode in which the completeness of the signal issued by a link partner is examined. In another embodiment, the internal fixed resistors 211 and 213 exist at the second transmitting pair T+/T− of the optical transceiver module 203, and each of the internal fixed resistors 211 and 213 is coupled between one of the second transmitting pair T+/T− and a ground, respectively. When the host 210 or the device 250 enters a compliance mode, data transmission between the host 210 and the device 250 can not be performed. Thus, one link partner can not accurately determine whether another link partner is coupled to the one link partner through an optical transceiver unit, and, as a result, data transmission between the two link partners (such as a host and a device) can not be stably performed through the optical transceiver unit to build the optical fiber communication. Thus, it is desired to provide a new data transmission system and method which solves the above problems.

According to the invention, when a host or a device is coupled to an optical transceiver unit, if the host or the device enters an abnormal operation mode, the host or the device can be controlled to exit from the abnormal operation mode by a controller within in the host or the device. Accordingly, when both of a host and a device are coupled to an optical transceiver unit and ready for data transmission, normal data transmission is performed between the host and the device. In an embodiment, a host or a device exits from the abnormal operation mode and returns to a link detection state (for example, Rx.Detect state in the USB standard) or a response signal polling state (for example, polling.LFPS state in the USB standard) of the host or the device through the controlling of a controller within the host or the device to detect whether the host or the device is coupled to another device or another host or whether another device or another host has issued a response signal. The above host and device can be implemented as a host and device with a serial transmission interface specification, such as a PCI-e (peripheral controller interface-express) interface specification or a USB 3.0 interface specification, which perform optical fiber transmission through an optical transceiver unit.

Figure 3:
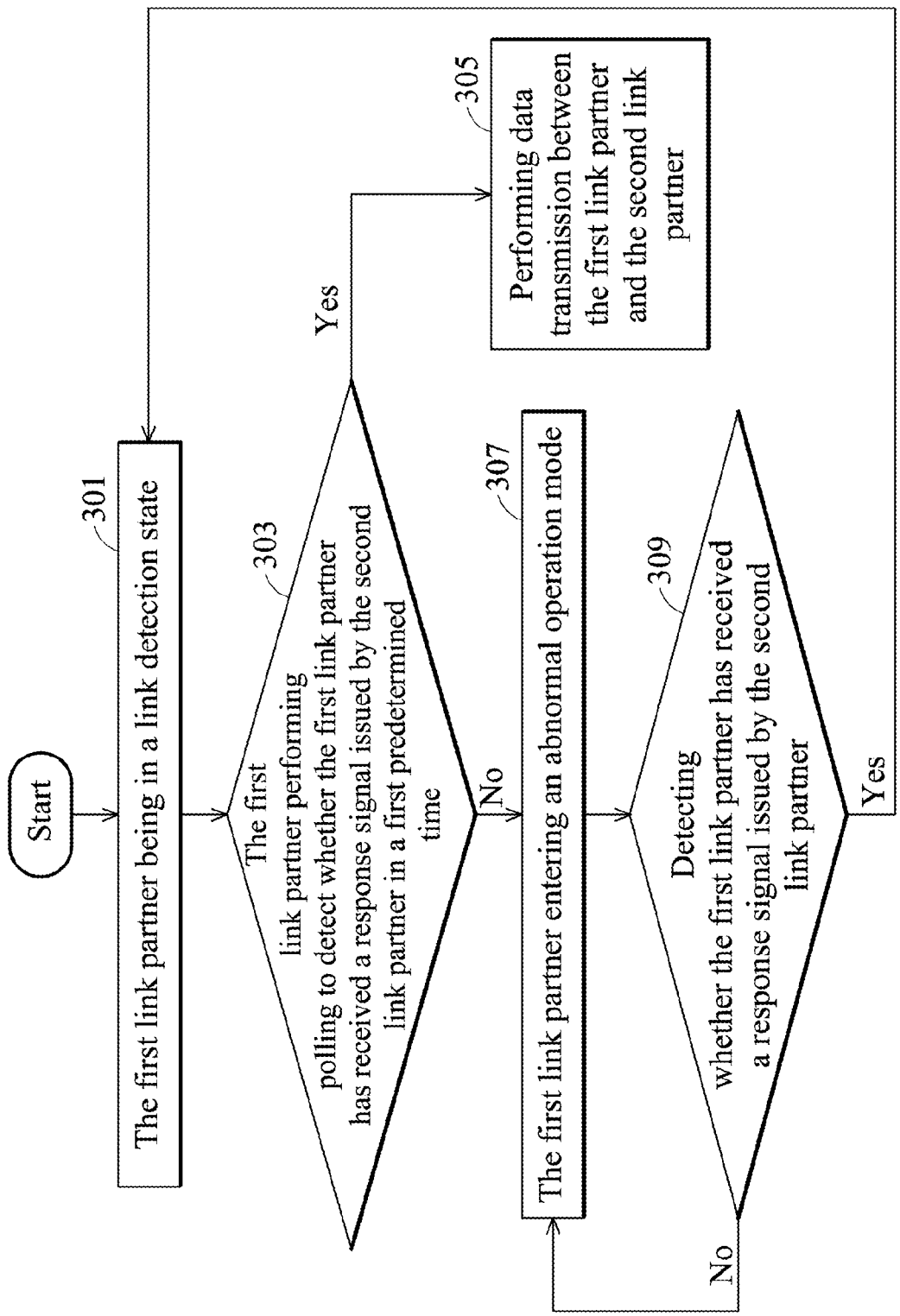
FIG. 3 is a flow chart of one exemplary embodiment of a data transmission between a first link partner and a second link partner.

FIG. 3 is a flow chart of one exemplary embodiment of a data transmission between a first link partner and a second link partner (such as between a host and a device). In FIG. 3, an embodiment is described, wherein, a first link partner (such as a host) performs polling to detect whether a second link partner (such as a device) has be inserted. The steps of the second link partner (such as a device) performing polling to detect whether the first link partner (such as a host) has be inserted is the same as that of the steps of FIG. 3; thus, description thereof is omitted here.

In the step 301, the first link partner is in a link detection state (such as Rx.detect state). When the first link partner is coupled to one terminal of the optical transceiver unit, since the optical transceiver modules at the two terminals of the optical transceiver unit 230 have internal fixed resistors, the first link partner detects that a differential terminator impedance is present. When the first link partner detects that a differential terminator impedance is present, the first link partner issues a link training sequence. At this time, the first link partner enters into a response signal polling state. The flow proceeds to step 303.

In the step 303, the first link partner performs polling to detect whether the first link partner has received a response signal issued by the second link partner in a first predetermined time. During the first predetermined time, the first link partner is in the response signal polling state. In an embodiment, the first link partner performs polling to detect whether the first link partner has received a low-frequency periodic signal issued by the second link partner in the first predetermined time, and, during the first predetermined time, the first link partner is in a low-frequency periodic signal polling state (Polling.LFPS state). If the first link partner has received a low-frequency periodic signal issued by the second link partner, the flow proceeds to step 305; if the first link partner has not received a low-frequency periodic signal issued by the second link partner, the flow proceeds to step 307. In the embodiment, the first link partner includes a first timer which is initiated when the first link partner enters into the response signal polling state to perform a clocking operation to detect whether the first predetermined time has been exceeded. Similarly, the second link partner also includes a first timer which is initiated when the second link partner enters into the response signal polling state to perform a clocking operation to detect whether the first predetermined time has been exceeded. In an embodiment, the first timers are implemented in link layers of controllers of the first link partner and the second link partner, respectively. When the first timers detect that the first predetermined time has been exceeded, then step 305 or 307 is performed. Then, the first link partner and the second link partner reset the first timers (that is the clocking result of the clock operation is cleared) to re-perform the clocking operation.

In the step 305, when both of the first link partner and the second link partner are coupled to the two optical transceiver modules of the optical transceiver unit respectively, the first link partner detects the response signal issued by the second link partner, and the link training sequence has been built successfully. Thus, the data transmission between the first link partner and the second link partner is performed.

In the step 307, when the first link partner does not detect the response issued by the second link partner in the first predetermined time, the link training sequence has not been built successfully, and the first link partner enters an abnormal operation mode. In an embodiment, the abnormal operation mode is a compliance mode. In the abnormal operation mode, data transmission can not be performed between the first link partner and the second link partner. The flow proceeds to Step 309.

In the step 309, in the abnormal operation mode, the first link partner performs polling to detect whether the first link partner has received a response signal issued by the second link partner. If the first link partner has received a response signal issued by the second link partner, the flow proceeds to step 301. If the first link partner has not received a response signal issued by the second link partner, the flow proceeds to step 307. In the embodiment, the first link partner includes a detection circuit which is initiated when the first link partner enters the abnormal operation mode to detect whether the first link partner has received a response signal issued by the second link partner. Similarly, the second link partner also includes a detection circuit which is initiated when the second link partner enters the abnormal operation mode to detect whether the second link partner has received a response signal issued by the first link partner. In an embodiment, the detection circuits are implemented in link layers of controllers of the first link partner and the second link partner, respectively. When the detection circuit detects that the first link partner has not received a response signal issued by the second link partner, or specifically, the second link partner has not been inserted or the second link partner is not ready for data transmission, the flow proceeds to step 307, and the first link partner stays in the abnormal operation mode. When the detection circuit detects that the first link partner has received a response signal issued by the second link partner, or specifically, the second link partner has been inserted, the first link partner exits from the abnormal operation mode. Then, the flow returns to step 301.

After step 301 is performed, when the first link partner and the second link partner are coupled to the optical transceiver modules, the link training sequence has been built successfully. Thus, steps 303 and 305 are then performed to perform normal data transmission between the first link partner and the second link partner.

Figure 4:
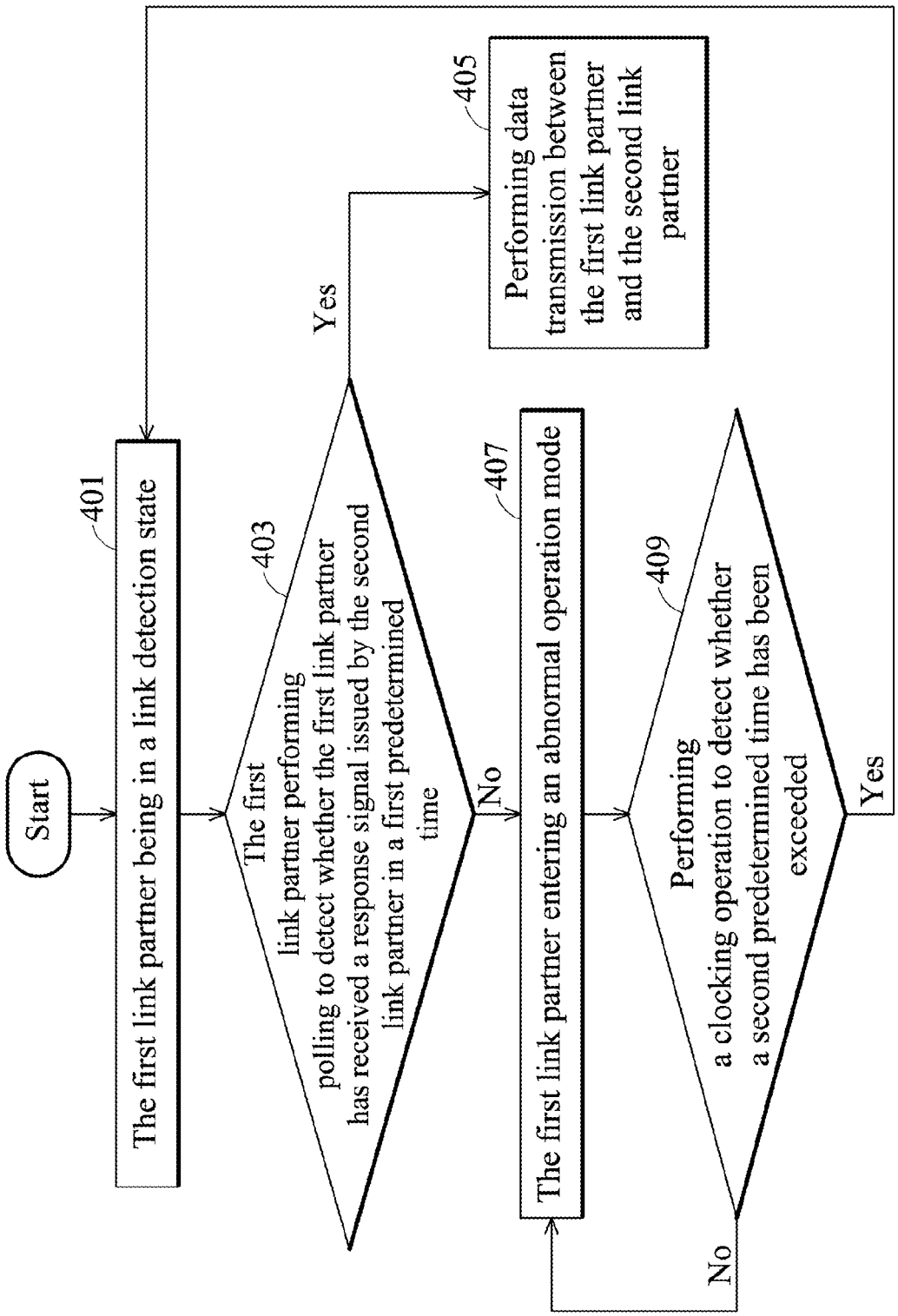
FIG. 4 is a flow chart of another exemplary embodiment of a data transmission between a first link partner and a second link partner.

FIG. 4 is a flow chart of another exemplary embodiment of a data transmission between a first link partner and a second link partner (such as between a host and a device). In FIG. 4, an embodiment is described in that a first link partner (such as a host) performs polling to detect whether a second link partner (such as a device) has be inserted.

In the embodiment of FIG. 4, the steps 401, 403, 405, and 407 are the same as the steps 301, 303, 305, and 307 of the embodiment of FIG. 3; thus, the descriptions thereof are omitted here.

In the step 409, in the abnormal operation mode, it is detected whether a second predetermined time has been exceeded. If the second predetermined time has been exceeded, the flow returns to step 401. If the second predetermined time has not been exceeded, the flow returns to step 407. In the embodiment, the first link partner includes a second timer which is initiated when the first link partner enters into the response signal polling state to perform a clocking operation to detect whether the second predetermined time has been exceeded. Similarly, the second link partner also includes a second timer which is initiated when the second link partner is in the response signal polling state to perform a clocking operation to detect whether the second predetermined time has been exceeded. In an embodiment, the second timers are implemented in link layers of controllers of the first link partner and the second link partner, respectively. When the second timer detects that the second predetermined time has exceed, the first link partner exits from the abnormal operation mode. In the embodiment, when step 401 is performed, the first link partner returns to the link detection state and resets the second timer (that is, the clocking result of the clock operation is cleared).

When the second timer performs the clocking operation to detect that the second predetermined time has not been exceeded, the first link partner stays in the abnormal operation mode in step 407.

After step 401 is performed, when the first link partner and the second link partner are coupled to the optical transceiver modules, the link training sequence has been built successfully. Steps 403 and 405 are then performed to perform normal data transmission between the first link partner and the second link partner.

Figure 5:
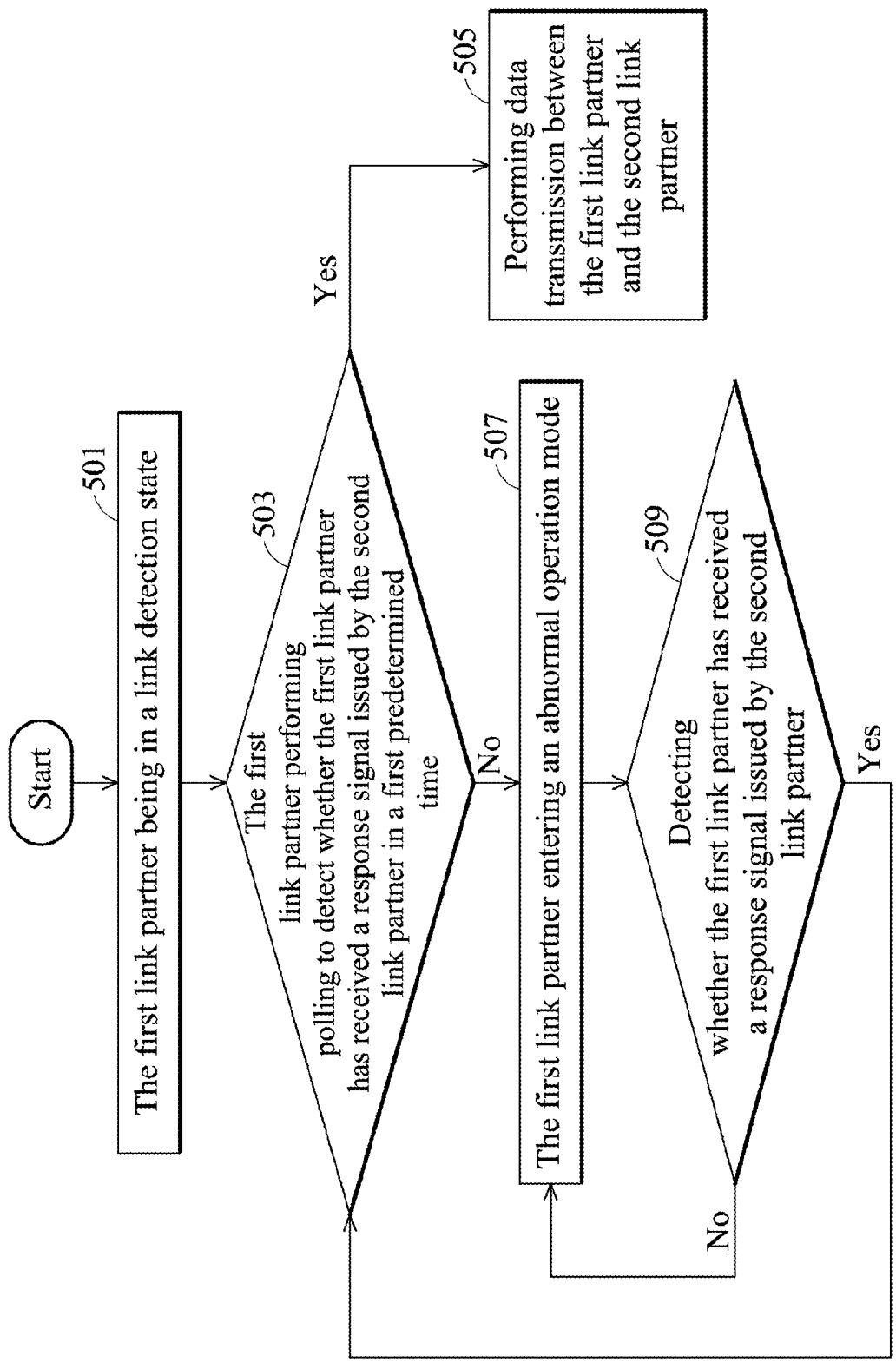
FIG. 5 is a flow chart of another exemplary embodiment of a data transmission between a first link partner and a second link partner.

FIG. 5 is a flow chart of another exemplary embodiment of a data transmission between a first link partner and a second link partner. In the embodiment of FIG. 5, the steps 501, 503, 505, and 507 are the same as the steps 301, 303, 305, and 307 of the embodiment of FIG. 3; thus, descriptions thereof are omitted here.

In the step 509, in the abnormal operation modes, the first link partner performs polling to detect whether the first link partner has received a response signal issued by the second link partner. If the first link partner has received a response signal issued by the second link partner, the flow returns to step 503. If the first link partner has not received a response signal issued by the second link partner, the flow returns to step 507. When a detection circuit of the first link partner detects that the first link partner has not received a response signal issued by the second link partner, or specifically, the second link partner has not been inserted or the second link partner or the second link partner is not ready for data transmission, step 507 is performed, and the first link partner stays in the abnormal operation mode. When the detection circuit detects that the first link partner has received a response signal issued by the second link partner, or specifically, the second link partner has been inserted, the first link partner exits from the abnormal operation mode. Then, in the embodiment of FIG. 5, step 503 is performed.

After step 503 is performed, when the first link partner and the second link partner are coupled to the optical transceiver modules, the link training sequence has been built successfully since the first link partner has received a response signal issued by the second link partner. Step 505 is then performed to perform normal data transmission between the first link partner and the second link partner.

Figure 6:
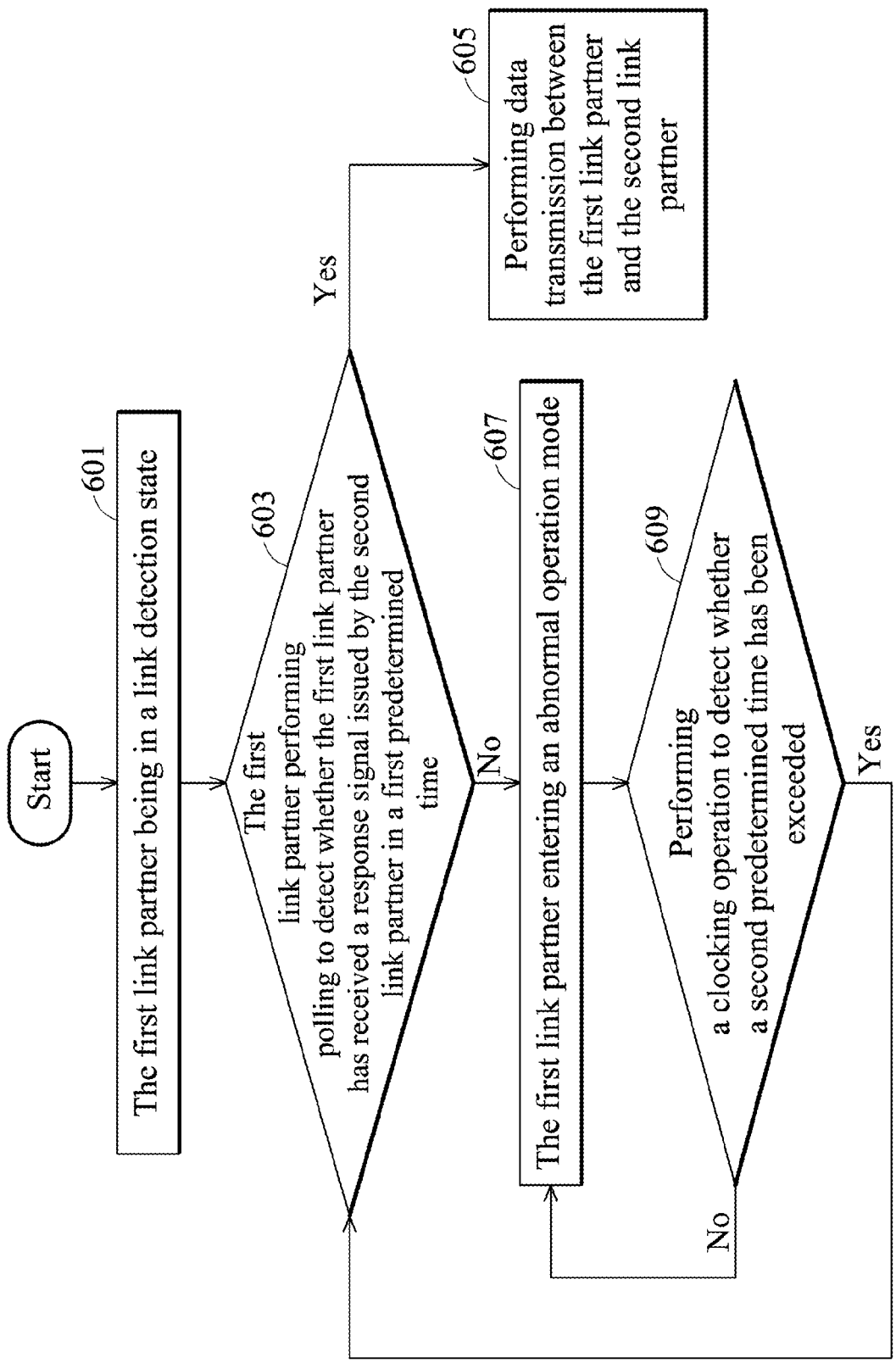
FIG. 6 is a flow chart of further another exemplary embodiment of a data transmission between a first link partner and a second link partner.

FIG. 6 is a flow chart of another exemplary embodiment of a data transmission between a first link partner and a second link partner. In the embodiment of FIG. 6, the steps 601, 603, 605, and 607 are the same as the steps 401, 403, 405, and 407 of the embodiment of FIG. 4; thus, descriptions thereof are omitted here.

In the step 609, in the abnormal operation mode, it is detected whether a second predetermined time has been exceeded. If the second predetermined time has been exceeded, the flow returns to step 603. If the second predetermined time has not been exceeded, the flow returns to step 607. When the second timer performs the clocking operation to detect that the second predetermined time has been exceeded, the first link partner exits from the abnormal operation mode. In the embodiment, when step 603 is performed., the first link partner then returns to the response signal polling state and resets the second timer (that is, the clocking result of the clock operation is cleared) to re-clock the second predetermined time.

When the second timer performs the clocking operation to detect that the second predetermined time has not been exceeded, the first link partner stays in the abnormal operation mode in step 607.

After step 603 is performed, when the first link partner and the second link partner are coupled to the optical transceiver modules, the link training sequence has been built successfully since the first link partner has received a response signal issued by the second link partner. Next, step 605 is performed to perform normal data transmission between the first link partner and the second link partner.

FIGS. 3-6 show four exemplary embodiments. In these embodiments, when a host or a device is coupled to an optical transceiver unit, if the host or the device enters an abnormal operation mode, the host or the device can be controlled to exit from the abnormal operation mode by a controller within in the host or the device. In an embodiment, a host or a device exits from the abnormal operation mode and returns to a link detection state or a response signal polling state of the host or the device through controlling of a controller within the host or the device to detect whether the host or the device is coupled to another device or another host or whether another device or another host issues a response signal. Accordingly, when both of a host and a device are coupled to an optical transceiver unit and ready for data transmission, normal data transmission is performed between the host and the device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data transmission system comprising:
a first link partner comprising a controller; and
an optical transceiver unit;
wherein when the first link partner is coupled to one terminal of the optical transceiver unit and a second link partner is not coupled to another terminal of the optical transceiver unit, the first link partner enters in an abnormal operation mode;
wherein when the first link partner is in the abnormal operation mode, the controller controls the first link partner to exit from the abnormal operation mode;
wherein after the first link partner exits from the abnormal operation mode, the first link partner enters into a link detection state or a response signal polling state; and
wherein the first link partner enters into the link detection state to detect whether the first link partner is coupled to the terminal of the optical transceiver unit, and when the controller detects that a differential terminator impedance is present, the first link partner enters into the response signal polling state.

2. The data transmission system as claimed in claim 1, wherein the controller comprises a detection circuit;
   wherein when the first link partner enters the abnormal operation mode, the detection circuit is initiated to detect whether the first link partner has received a response signal issued by the second link partner, and
   wherein when the detection circuit detects that the first link partner has received the response signal, the detection circuit controls the first link partner to exit from the abnormal operation mode.

3. The data transmission system as claimed in claim 1, wherein the controller comprises a timer;
   wherein when the first link partner enters the abnormal operation mode, the timer performs a clocking operation; and
   wherein when the timer performs the clocking operation to detect that a predetermined time has been exceeded, the timer controls the first link partner to exit from the abnormal operation mode.

4. The data transmission system as claimed in claim 3, wherein when the first link partner exits from the abnormal operation mode, the first link partner resets the timer to re-perform the clocking operation.

5. The data transmission system as claimed in claim 1, wherein the abnormal operation mode is a compliance mode in which completeness of a signal issued by the first link partner is examined.

6. The data transmission system as claimed in claim 1, wherein the first link partner enters in the response signal polling state to detect whether the first link partner has received a response signal issued by the second link partner in a first predetermined time.

7. The data transmission system as claimed in claim 6, wherein when the controller detects that the first link partner has received the response signal issued by the second link partner in the first predetermined time, data transmission between the first partner and the second link partner is performed through the optical transceiver unit, and when the controller detects that the first link partner has not received the response signal issued by the second link partner in the first predetermined time, the first link partner enters the abnormal operation mode.

8. A data transmission method for a data transmission system, wherein the data transmission system comprises a first link partner, a second link partner, and an optical transceiver unit coupled between the first link partner and the second link partner, and the data transmission method comprises:
   coupling the first link partner to one terminal of the optical transceiver unit;
   controlling the first link partner to enter in an abnormal operation mode when the second link partner is not coupled to another terminal of the optical transceiver unit;
   determining whether a predetermined condition has been satisfied when the first link partner is in the abnormal operation mode;
   controlling the first link partner to exit from the abnormal operation mode when the predetermined condition has been satisfied;
   after the first link partner exits from the abnormal operation mode, the first link partner entering into a link detection state or a response signal polling state, wherein the first partner enters into the link detection state to detect whether the first link partner is coupled to the terminal of the optical transceiver unit; and
   when it is detected that a differential terminator impedance is present, the first link partner entering into the response signal polling state.

9. The data transmission method as claimed in claim 8, wherein the predetermined condition is to detect whether the first link partner has received a response signal issued by the second link partner and to control the first link partner to exit from the abnormal operation mode when it is detected that the first link partner has received the response signal.

10. The data transmission method as claimed in claim 8, wherein the predetermined condition is to perform a clocking operation to detect whether a predetermined time has been exceeded and to control the first link partner to exit from the abnormal operation mode when it is detected that the predetermined time has been exceeded.

11. The data transmission method as claimed in claim 10, wherein when the first link partner exits from the abnormal operation mode, a clocking result of the clocking operation is cleared, and the clocking operation is re-performed.

12. The data transmission method as claimed in claim 8, wherein the abnormal operation mode is a compliance mode in which completeness of a signal issued by the first link partner is examined.

13. The data transmission method as claimed in claim 8,
   wherein the first link partner enters in the response signal polling state to detect whether the first link partner has received a response signal issued by the second link partner in a first predetermined time.

14. The data transmission method as claimed in claim 13 further comprising:
   when the first link partner has received the response signal issued by the second link partner in the first predetermined time, performing data transmission between the first partner and the second link partner through the optical transceiver unit; and
   when the first link partner has not received the response signal issued by the second link partner in the first predetermined time, the first link partner entering the abnormal operation mode.

15. The data transmission system as claimed in claim 1, wherein the optical transceiver unit further includes a first optical transceiver module, a second optical transceiver module and an optical fiber coupled between the first and second optical transceiver modules.

16. The data transmission method as claimed in claim 8, wherein the optical transceiver unit further includes a first optical transceiver module, a second optical transceiver module and an optical fiber coupled between the first and second optical transceiver modules.

* * * * *